US011200583B2

(12) United States Patent
Wagner et al.

(10) Patent No.: US 11,200,583 B2
(45) Date of Patent: Dec. 14, 2021

(54) USING SURFACE TEXTURES AS UNIQUE IDENTIFIERS FOR TRACKING MATERIAL WITH A DISTRIBUTED LEDGER

(71) Applicant: Raytheon Company, Waltham, MA (US)

(72) Inventors: Gregory M. Wagner, Tucson, AZ (US); Matthew T. Young, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 344 days.

(21) Appl. No.: 16/360,718

(22) Filed: Mar. 21, 2019

(65) Prior Publication Data

US 2020/0302448 A1    Sep. 24, 2020

(51) Int. Cl.
*G06Q 30/00* (2012.01)
*G06F 16/2458* (2019.01)
*H04N 7/18* (2006.01)

(52) U.S. Cl.
CPC ..... *G06Q 30/0185* (2013.01); *G06F 16/2471* (2019.01); *H04N 7/183* (2013.01)

(58) Field of Classification Search
CPC . G06Q 30/0185; G06F 16/2471; H04N 7/183
USPC ........................................................ 705/318
See application file for complete search history.

(56) References Cited

U.S. PATENT DOCUMENTS

| 9,263,061 | B2 | 2/2016 | Hines et al. |
| 9,760,771 | B2 | 9/2017 | Ishiyama |
| 10,002,362 | B1* | 6/2018 | Endress ........... G06K 19/06037 |
| 10,193,695 | B1 | 1/2019 | Endress et al. |
| 2005/0015253 | A1 | 1/2005 | Rambo et al. |
| 2006/0265211 | A1 | 11/2006 | Canniff et al. |
| 2020/0160354 | A1* | 5/2020 | Howard ........... G06K 19/06037 |
| 2021/0049617 | A1* | 2/2021 | Li ......................... H04L 9/0866 |

(Continued)

FOREIGN PATENT DOCUMENTS

| CN | 108416590 A | 8/2018 |
| CN | 109034135 A | 12/2018 |
| EP | 3 249 581 A1 | 11/2017 |

(Continued)

OTHER PUBLICATIONS

Bocek et al., "Blockchain Everywher—A Use-case of Blockchains in the Pharma Supply-Chain;" IFIP/IEEE International Symposium on Integrated Network Management, 2017, 6 pages, pp. 772-777.

(Continued)

*Primary Examiner* — Daniel A Hess
(74) *Attorney, Agent, or Firm* — Daly, Crowley, Mofford & Durkee, LLP (57) ABSTRACT

A method is disclosed for supply chain management, the method comprising: capturing, by a part scanner, a first image of a surface of a part; generating, by the part scanner, a first surface descriptor for the part based on the first image; identifying, by the part scanner, a second surface descriptor that corresponds to a component of the part; generating, by the part scanner, an authentication record for the part based on the first surface descriptor and the second surface descriptor; and storing, by the part scanner, the authentication record in a cryptographically-auditable ledger of a blockchain platform.

20 Claims, 9 Drawing Sheets

(56) References Cited

U.S. PATENT DOCUMENTS

2021/0117933 A1* 4/2021 Lobner .................. G06F 16/27

FOREIGN PATENT DOCUMENTS

| JP | 2014049015 A | 3/2014 |
|---|---|---|
| WO | WO 2012/145842 A1 | 11/2012 |
| WO | WO 2019/030682 A1 | 2/2019 |

OTHER PUBLICATIONS

Notification of Transmittal of the International Search Report and the Written Opinion of the International Searching Authority, or the Declaration, dated Jun. 8, 2020, for International Application No. PT/US2020/019815, 1 page.
International Search Report dated Jun. 18, 2020, for International Application No. PT/US2020/019815, 5 pages.
Written Opinion of the International Searching Authority, dated Jun. 18, 2020, for International Application No. PT/US2020/019815, 9 pages.
U.S. Appl. No. 16/360,738, filed Mar. 21, 2019, Wagner, et al.
Abeyratne et al., "Blockchain Ready Manufacturing Supply Chain Using Distributed Ledger;" International Journal of Research in Engineering and Technology (IJRET), vol. 5, Issue 9; Sep. 2016; 11 Pages.
Crosby et al., "BlockChain Technology: Beyond Bitcoin;" Sutardja Center for Entrepreneurship & Technology Technical Report; Oct. 16, 2015; 35 Pages.
Madhwal et al., "Blockchain and Supply Chain Management: Aircrafts' Parts' Business Case;" 28th DAAAM International Symposium on Intelligent Manufacturing and Automation; Jan. 2017; pp. 1051-1056; 6 Pages.
PCT International Search Report and Written Opinion dated Jun. 25, 2020 for International Application No. PCT/US2020/019420; 18 Pages.

* cited by examiner

USING SURFACE TEXTURES AS UNIQUE IDENTIFIERS FOR TRACKING MATERIAL WITH A DISTRIBUTED LEDGER

BACKGROUND

Supply chains transform components and raw materials into a finished product. Supply chains can be provided with counterfeit components on occasion. Because counterfeit components can have inferior specifications and quality, they may represent a hazard if incorporated into critical systems, such as aircraft navigation, military equipment, or space vehicles. Accordingly, there is a need for improved techniques for tracking component provenance and identifying counterfeit components as they move across a supply chain before the counterfeit components have been integrated into the supply chain's finished product.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is disclosed for supply chain management, the method comprising: capturing, by a part scanner, a first image of a surface of a part; generating, by the part scanner, a first surface descriptor for the part based on the first image; identifying, by the part scanner, a second surface descriptor that corresponds to a component of the part; generating, by the part scanner, an authentication record for the part based on the first surface descriptor and the second surface descriptor; and storing, by the part scanner, the authentication record in a cryptographically-auditable ledger of a blockchain platform.

According to aspects of the disclosure, a system is disclosed comprising: a camera; a memory; and at least one processor operatively coupled to the camera and the memory, the at least one processor being configured to perform the operations of: capturing, by the camera, a first image of a surface of a part; generating a first surface descriptor for the part based on the first image; identifying a second surface descriptor that corresponds to a component of the part; generating an authentication record for the part based on the first surface descriptor and the second surface descriptor; and storing the authentication record in a cryptographically-auditable ledger of a blockchain platform.

According to aspects of the disclosure, a non-transitory computer-readable medium storing one or more processor executable instructions, which when executed by at least one processor, cause the at least one processor to perform the operations of: capturing a first image of a surface of a part; generating a first surface descriptor for the part based on the first image; identifying a second surface descriptor that corresponds to a component of the part; generating an authentication record for the part based on the first surface descriptor and the second surface descriptor; and storing the authentication record in a cryptographically-auditable ledger of a blockchain platform.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
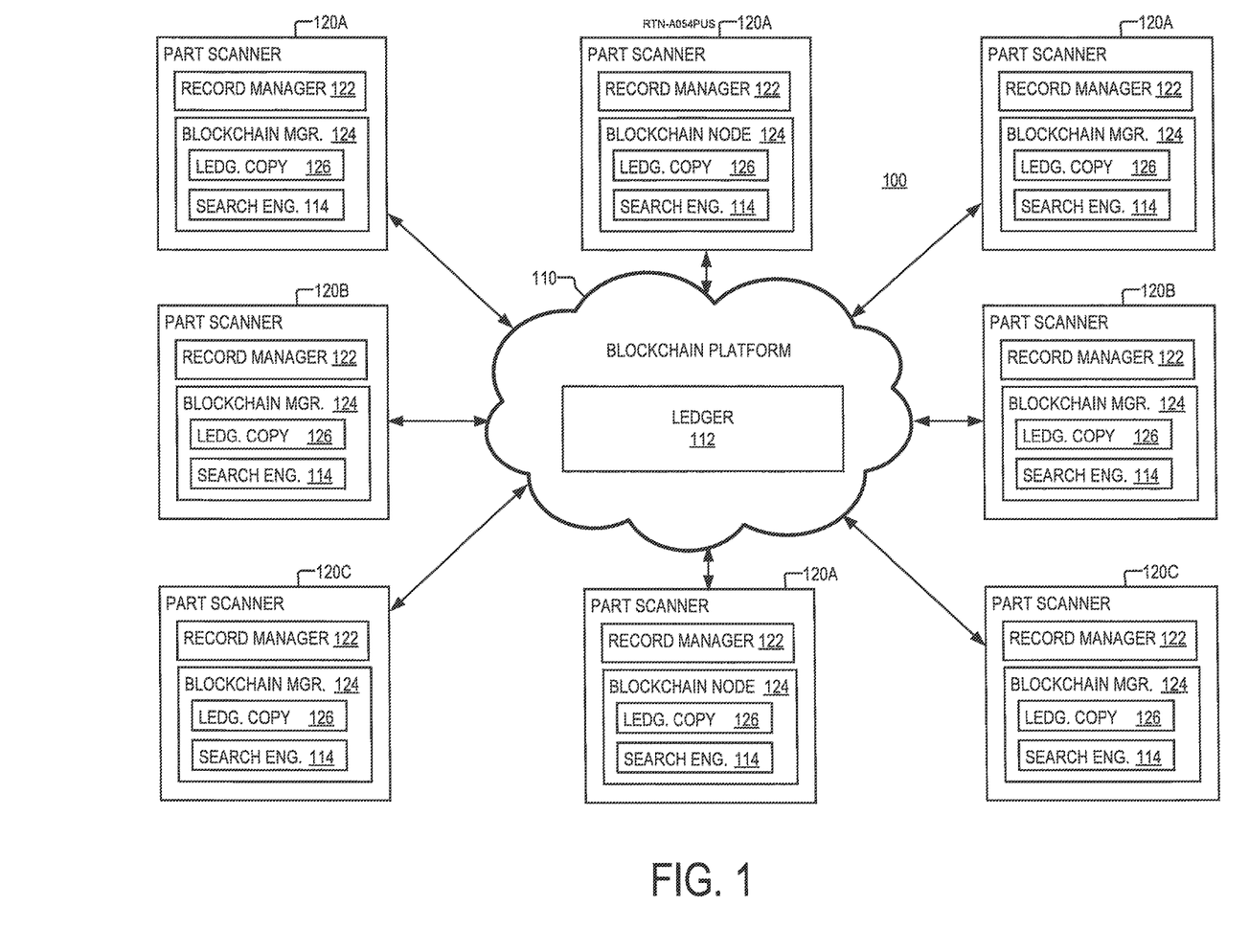
FIG. 1 is a diagram of an example of a system, according to aspects of the disclosure.

FIG. 1 is a diagram of an example of a system 100, according to aspects of the disclosure. The system 100 may be configured to generate and maintain authentication records for parts in a supply chain 400 (shown in FIG. 4). The authentication records may be used to track and verify the authenticity of components as the components move across the supply chain 400. The authentication records may be the same or similar to the authentication record 300, which is discussed further below with respect to FIG. 3.

The system 100 may include a blockchain platform 110 that is implemented at least in part by using a plurality of part scanners 120A that are operatively coupled to one another via a communications network (not shown.) The blockchain platform 110 may include any suitable type of cryptographically auditable platform that is configured to provide secure access control for authentication records that are stored in the blockchain platform 110. For ease of explanation, the blockchain platform 110 is depicted as being separate from the part scanners 120. However, according to the present example, the blockchain platform 110 is implemented as a peer-to-peer network including the part scanners 120, such as each of the part scanners 120 is configured to operate as a node of the blockchain platform 110.

The blockchain platform 110 may include a ledger 112, as shown. The ledger 112 may include a list of records which are linked using a cryptographic technique. The ledger 112 may be distributed between the plurality of part scanners 120, such that each of the part scanners 120 stores a respective copy 126 of the ledger 122 in the part scanner's 120 memory. The authentication records may be stored on the ledger 112 by using a consensus algorithm that is configured to ensure correct replication of authentication records across the nodes in the blockchain platform 110, such that once data is stored in a given block of the ledger, that data cannot be altered retroactively without a consensus of a network majority.

Figure 4:
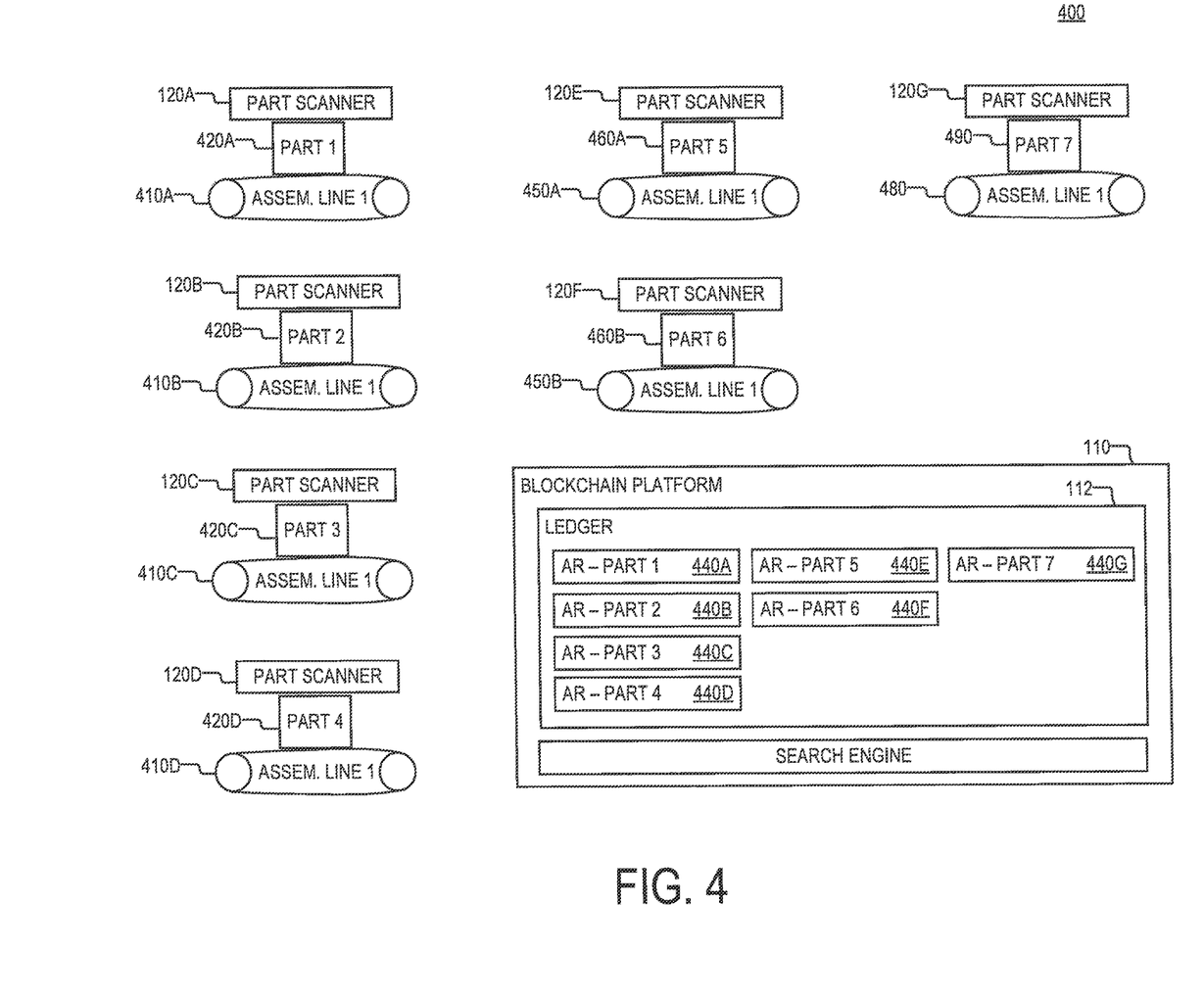
FIG. 4 is a diagram of an example of a supply chain, according to aspects of the disclosure.

Each of the part scanners 120 may be deployed at a different stage of the supply chain 400 and configured to execute a respective record manager 122 and a respective blockchain manager 124. The respective record manager 122 of each of the part scanners 120 may include one or more processes that are executed by the part scanner (e.g., by a processor of the part scanner). The one or more processes that constitute the respective record manager 122 of each of the part scanners 120 may be configured to perform various part authentication functions. In some implementations, the part authentication functions may include: (i) generating authentication records for parts that are produced at a stage in supply chain 400, and (ii) generating surface descriptors for parts whose authenticity is being verified.

The respective blockchain manager 124 of each of the part scanners 120 may include one or more processes that are executed by the part scanner. The one or more processes may be configured to perform functions that enable the part scanner 120 to operate as a node in the blockchain platform. In this regard, the one or more processes that constitute the blockchain manager 124 may be configured to maintain a respective copy of the 126 of the ledger 112, store new authentication records on the ledger 112, and interact with other nodes in the blockchain platform 110 (e.g., with other part scanners 120) to validate the authenticity of authentication records that are stored in the blockchain platform.

In some implementations, the respective blockchain manager 124 of each of the part scanners may be configured to execute a search engine 114. The search engine 114 may be configured to: (i) receive a search key from any of the of the part scanners 120, and (ii) determine whether any of the authentication records stored in the ledger 112 matches the search key. Any of the search keys received by the search engine 114 may include a surface descriptor for a given component, and it may be submitted for the purpose of determining whether the given component is authentic. When a valid authentication record is stored on the ledger 112, which contains the surface descriptor of the given component, the given component may be deemed authentic. By contrast, when the ledger 112 does not store any authentication records that include the surface descriptor of the component, the given component may be deemed counterfeit. The manner in which component surface descriptors are generated and is discussed further below with respect to FIGS. 2-7. In some implementations, the search engine 114 may be configured to operate in accordance with the process 800, which is discussed further below with respect to FIG. 8.

In some implementations, the communications network 120 that forms the part scanners 120 may include one or more of the Internet, a TCP/IP-based network, a local-area network (LAN), a wide-area network (WAN), and/or any other suitable type of network. Although in the present example the blockchain platform 110 includes only the part scanners 120, it will be understood that alternative implementations are possible in which the blockchain platform includes third-party nodes. Moreover, it will be understood that other implementations are also possible in which the blockchain platform 110 is implemented separately from the part scanners 120. Any of the third-party nodes may be implemented using a computing device, such as the computing device 900, which is discussed further below with respect to FIG. 9. According to the present example, the blockchain platform 110 is a privately-managed blockchain platform. However, alternative implementations are possible in which the blockchain platform 110 is publicly managed. Stated succinctly, the present disclosure is not limited to any specific implementations of the blockchain platform 110.

Figure 2:
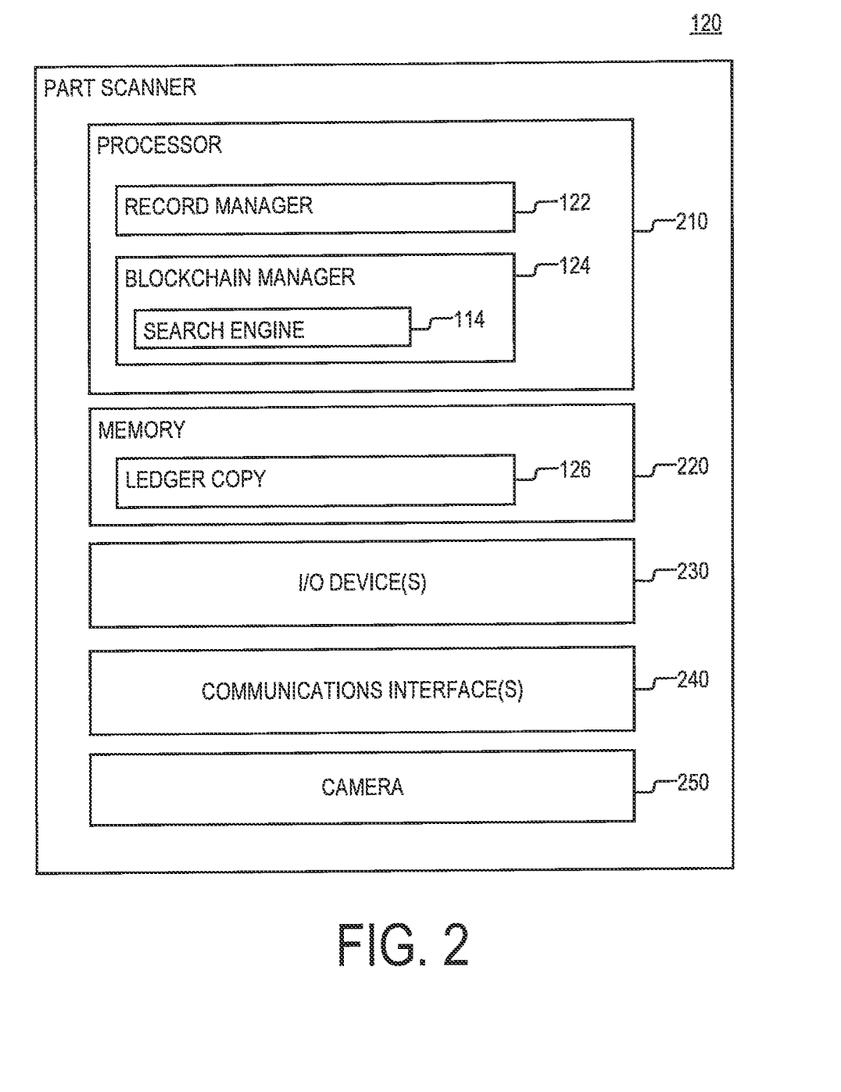
FIG. 2 is a diagram of an example of a part scanner, according to aspects of the disclosure.

FIG. 2 is a diagram of an example of a part scanner 120, which, as the numbering suggests, is representative of the part scanners 120A-C. As illustrated, the part scanner 120 may include a processor 210, I/O device(s) 220, communications interface(s) 240, and a camera 250. The processor 210 may include any suitable type of processing circuitry. For example, in some implementations, the processor 210 may include a general-purpose processor (e.g., a RISK-based processor, an x86-based processor), a graphical processing unit (e.g., a Maxwell-based processor), a Field-Programmable Gate Array (FPGA), an Application-Specific Integrated Circuit (ASIC), and/or any other suitable type of processing circuitry. The memory 220 may include any suitable type of volatile and/or non-volatile memory. In some implementations, the memory 220 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 230 may include any suitable type of input and/or output device, such as one or more mice, one or more keyboards, one or more microphones, or one more display screens, for example. The communications interface(s) 240 may include any suitable type of communications interface, such as one or more Ethernet adapters, one or more Wi-Fi adapters (e.g., 802.1414 adapters), and one or more Long-Term Evolution (LTE) adapters, for example. The camera 250 may include any suitable type of image-capturing device. According to the present example, camera 250 includes a near-field lens that is arranged to capture images of part surfaces from a close distance.

As noted above, in some implementations, the processor 120 may be configured to execute a record manager and a blockchain manager 124. Although in the present example, each of the record manager 122 and the blockchain manger 124 is implemented in software, alternative implementations are possible in which any of the record manager 122 and the blockchain manager 124 is implemented in hardware or as a combination of software or hardware. Furthermore, as noted above, in some implementations, the memory 220 may be configured to store a copy 126 of the ledger 112 of the blockchain platform 110.

Figure 3:
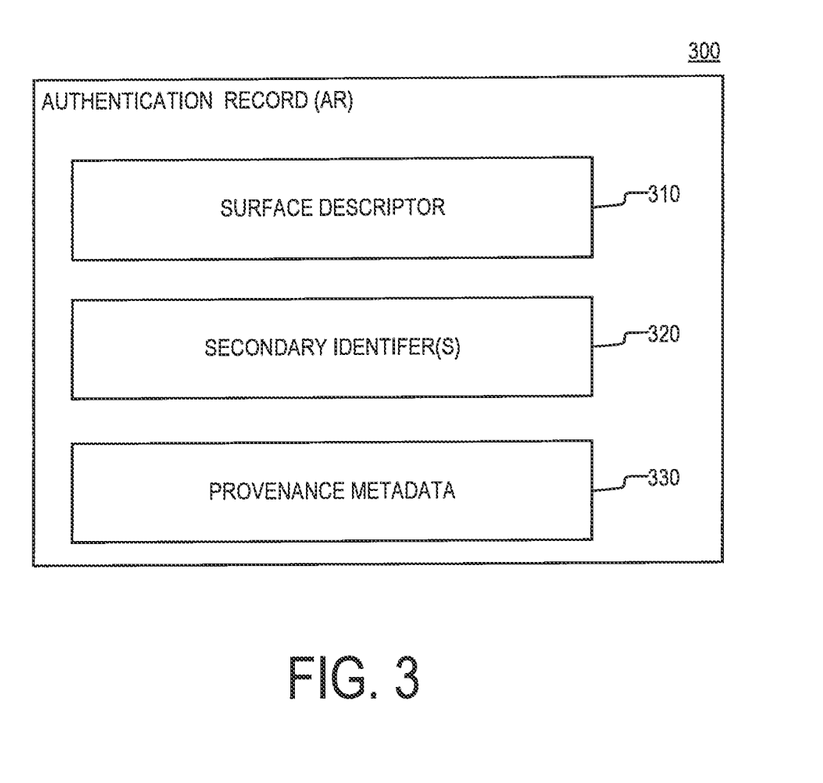
FIG. 3 is a diagram of an example of an authentication record, according to aspects of the disclosure.

FIG. 3 is a diagram of an example of an authentication record 300, according to aspects of the disclosure. The authentication record 300 may be used to certify the authenticity of a part that is used and/or produced in the supply chain 400. According to the present example, the part may include an article of manufacture, a machine, a machine part, and/or any other object that is used and/or produced in the supply chain of any manufacturing facility. In some implementations, the part represented by the authentication record 300 may be an integral object that is manufactured by molding plastic, casting metal, and/or any other similar process. Additionally or alternatively, in some implementations, the part represented by the authentication record may include an object that is produced by coupling (e.g., fastening or adhering) two or more smaller parts. The smaller parts that are used to form the part represented by the authentication record 300 are referred to as "components" of the part represented by the authentication record 300, and each of them may have a respective authentication record that is also stored in the blockchain platform 110.

The authentication record 300 may include a surface descriptor 310, one or more secondary identifiers 320, and provenance metadata 330. The surface descriptor 310 may include a feature vector that is generated based on an image of a surface of the part represented by the authentication record 300. In some implementations, the surface descriptor 310 may be generated by capturing a close image of a part surface and processing the image to extract a plurality of key point features of the image. According to the present example, the surface descriptor 310 is generated using a Speeded Up Robust Features (SURF) feature detector. However, alternative implementations are possible in which the surface descriptor 310 is generated using any other suitable image processing algorithm, such as Histogram of Oriented Gradients (HOG), Gradient Location and Orientation Histogram (GLOH), Local Energy-Based Shaped Histogram (LESH), and Scale-Invariant Feature Transform (SIFT).

The secondary identifier(s) 320 may include one or more of a serial number of the part that is represented by the authentication record 300, a part identifier corresponding to the part, or a lot identifier of the part. As can be readily appreciated, the serial number may uniquely identify the part among a plurality of parts from the same type, whereas the part identifier may identify the type of the part. The lot identifier, on the other hand, may identify the manufacturing batch of the part corresponding to the authentication record 300. The provenance metadata 330 may include one or more surface descriptors of components of the part that is represented by the authentication record 300. For instance, if the part is produced by attaching a first component to a second component, the provenance metadata 330 may include a first surface descriptor corresponding to the first component and a second surface descriptor corresponding to the second component. In some respects, including provenance metadata in the authentication record 300 allows the authenticity of the part's building components to be verified, in addition to verifying the authenticity of the part itself.

FIG. 4 is a diagram of an example of a supply chain 400, according to aspects of the disclosure. The supply chain 400 may include assembly lines 410A-D, 450A-B, and 480. The assembly lines 410A-D, 450A-B, and 480 may be configured to produce parts 420A-D, 460A-B, and 490, respectively. Parts 420A-D and 460A-B may be gradually assembled together to produce part 490. Specifically, parts 420A-B may be assembled together to produce part 460A; parts 420C-D may be assembled together to produce part 460B; and parts 460A-B may be assembled together to produce part 490. In some implementations, part 490 may constitute the finished product that is produced using the supply chain 400.

In some implementations, the assembly lines 410A-D, 450A-B, and 480 may belong to various contractors and sub-contracts that form the supply chain of an organization. Each of the assembly lines 410A-D, 450A-B, and 480 may be provided with a different one of the part scanners 120 to track the authenticity of parts that are used and produced on the assembly line. By using their respective part scanners 120, the assembly lines 410A-D, 450A-B, and 480 may interact with the blockchain platform 110 to store and retrieve authentication records for parts/components that are used in the supply chain 400, thus ensuring the integrity of the supply chain 400.

The assembly line 410A may be provided with the part scanner 120A and configured to produce a part 420A. The part scanner 120A may be arranged to generate an authentication record 440A for the part 420A and store the authentication record in the ledger 112 of the blockchain platform 110. The assembly line 410B may be provided with the part scanner 120B and configured to produce a part 420B. The part scanner 120B may be arranged to generate an authentication record 440B for the part 420B and store the authentication record in the ledger 112 of the blockchain platform 110. The assembly line 410C may be provided with the part scanner 120C and configured to produce a part 420C. The part scanner 120C may be arranged to generate an authentication record 440C for the part 420C and store the authentication record in the ledger 112 of the blockchain platform 110. The assembly line 410D may be provided with the part scanner 120D and configured to produce a part 420D. The part scanner 120D may be arranged to generate an authentication record 440D for the part 420D and store the authentication record in the ledger 112 of the blockchain platform 110.

The assembly line 450A may be configured to obtain parts 420A and 420B and assemble them together to produce a part 460A. The assembly line 450A may be provided with the part scanner 120E, which may be configured to: (i) use the blockchain platform 110 to validate the authenticity of the parts 420A and 420B before they are coupled to produce the part 460A, and (ii) generate an authentication record 440E for the part 460A and store the authentication record 440E in the ledger 112 of the blockchain platform 110. The assembly line 450B may be configured to obtain parts 420C and 420D and assemble them together to produce a part 460B. The assembly line 450B may be provided with the part scanner 120F, which may be configured to: (i) use the blockchain platform 110 to validate the authenticity of the parts 420C and 420D before they are coupled to produce the part 460A, and (ii) generate an authentication record 440F for the part 460B and store the authentication record 440E in the ledger 112 of the blockchain platform 110.

The assembly line 480 may be configured to obtain parts 460A and 460B and assemble them together to produce a part 490. The assembly line 480 may be provided with the part scanner 120G, as shown. The part scanner 120G may be configured to use the blockchain platform 110 to validate the authenticity of the parts 420A and 420B before they are coupled to produce part 490. Furthermore, the part scanner 120G may be configured to generate an authentication record 440G for the part 490 and store the authentication record 440G in the ledger 112 of the blockchain platform 110.

As used throughout the disclosure, the term "assembly line" may refer to any location where a part is manufactured, such as a manufacturing plant, a warehouse, of a conveyor belt, a quality-assurance (QA) testing station, for example. According to the present example, the assembly lines 410A-D, 450A-B, and 480 are situated at different geographic locations. However, it will be understood that alternative implementations are possible in which any of the assembly lines 410A-D, 450A-B, and 480 are situated at the same geographic location (e.g., in the same manufacturing plant, etc.). Although in the present example, each of the assembly lines 410A-D, 450A-B, and 480 belong to different contractors and subcontractors, it will be understood that alternative implementations are possible in which the assembly lines 410A-D, 450A-B, and 480 belong to the same manufacturing entity. Any of the authentication records generated by the part scanners 120A-G may be the same or similar to the authentication record 300, which is discussed above with respect to FIG. 3.

Figure 5:
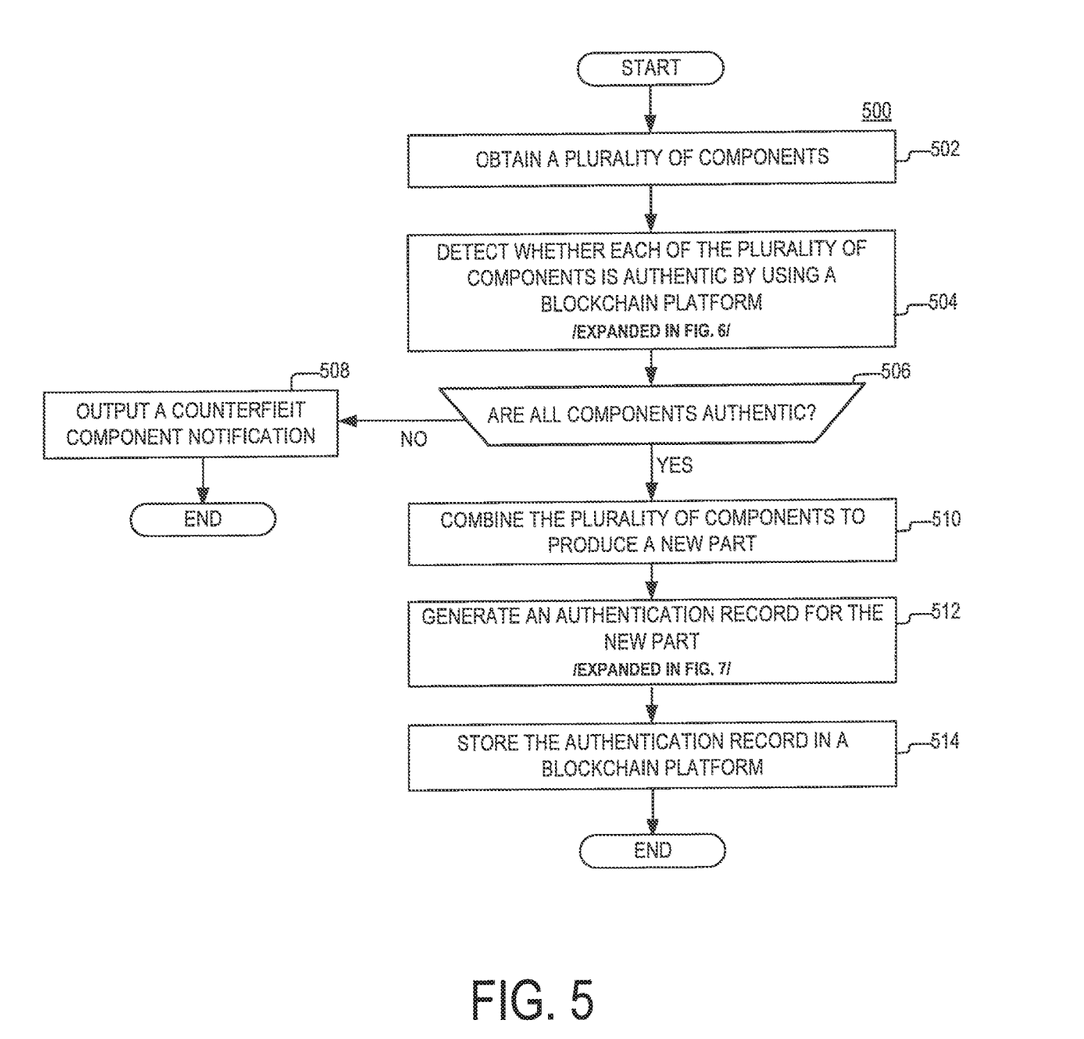
FIG. 5 is a flowchart of an example of a process, according to aspects of the disclosure.

FIG. 5 is a flowchart of an example of a process 500, according to aspects of the disclosure. At step 502, a plurality of components is obtained at an assembly line. At step 504 each of the plurality of components is scanned using a part scanner, after which the part scanner detects whether the component is authentic. In some implementations, the part scanner may be the same or similar to any of the part scanners 120, which are discussed above with respect to FIG. 1. In some implementations, to authenticate the components, the part scanner may use a blockchain platform, such as the blockchain platform 110, which is discussed above with respect to FIG. 1. In some implementations, each of the components may be scanned and authenticated in accordance with the process 600, which is discussed further below with respect to FIG. 6. At step 506, a determination is made if any of the parts in the plurality is not authentic. When at least one of the parts in the plurality is determined to not be authentic, the process 500 proceeds to step 508. Otherwise, when all of the components in the plurality have been determined to be authentic, the process 500 proceeds to step 510. At step 508, a notification is output that at least one of the components in the plurality is counterfeit. At step 510, the components in the plurality are assembled together to produce a new part. At step 512, a new authentication record is generated for the new part. In some implementations, the new authentication record may be generated in accordance with the process 700, which is discussed further below with respect to FIG. 7. At step 514, the new authentication record is stored in the blockchain platform.

According to aspects of the disclosure, the notification that one or more components are counterfeit may include a respective identifier for each of the components whose authenticity could not be successfully validated at step 504. Outputting the notification may include displaying an image or text on a display screen, outputting audio via one or more speakers, and/or transmitting the notification over a communications network to a remote computing device that is used by personnel to monitor the operation of the manufacturing line. It will be understood, that the present disclosure is not limited to any specific implementation of the notification that one or more of the plurality of components are counterfeit.

Figure 6:
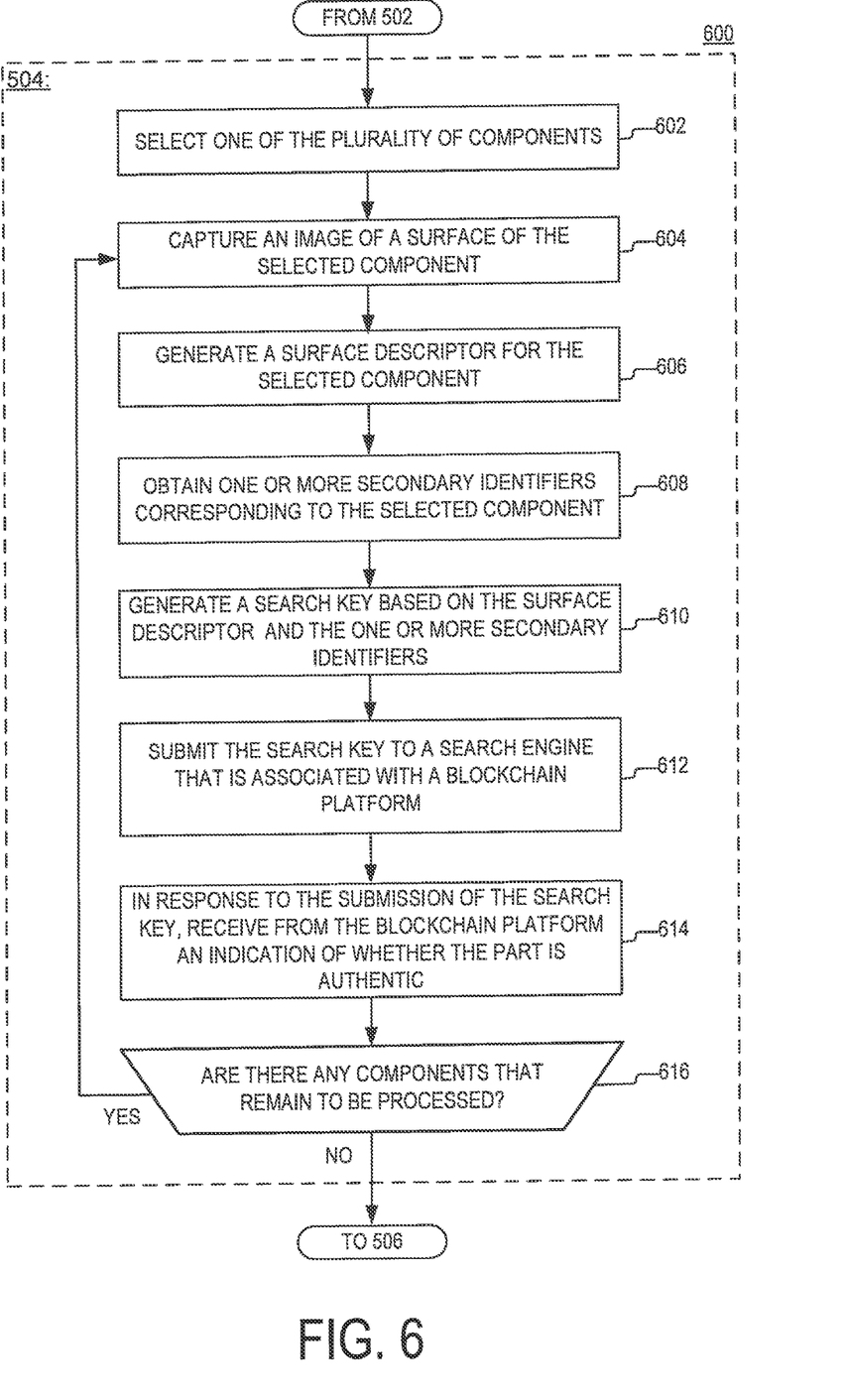
FIG. 6 is a flowchart of an example of a process associated with the process of FIG. 5, according to aspects of the disclosure.

FIG. 6 is a flowchart of an example of a process 600 for verifying the authenticity of a plurality of components, as specified by step 504 of the process 500. As noted above, process 600 may be performed by a part scanner that is associated with a manufacturing line. Furthermore, as noted above, the part scanner may verify the authenticity of the plurality of components by using a blockchain platform, such as the blockchain platform 110, which is discussed above with respect to FIG. 1. At step 602, one of the plurality of components is selected. At step 604, an image is captured of a surface of the selected component. In some implementations, the image may be captured using a camera that is part of the part scanner. At step 606, a surface descriptor for the selected component is generated based on the selected image. At step 608, one or more secondary identifiers associated with the selected component are obtained. According to the present example, the one or more secondary identifiers may include a lot identifier of the component and a part identifier of the selected component. In some implementations, the one or more secondary identifiers may be obtained by the part scanner by scanning a barcode or text that is printed on the selected component. Additionally or alternatively, in some implementations, an RFID tag that is attached to the selected component may be used to obtain the one or more secondary identifiers. Additionally or alternatively, in some implementations, the one or more secondary identifiers may be entered manually into the scanner (e.g., by using a keyboard or a mouse). Additionally or alternatively, in some implementations, the some of the secondary information may be retrieved from a database based on other secondary information associated with the selected component. For instance, in such implementations, the lot identifier of the selected component may be retrieved from a database based on the selected component's part identifier. Stated succinctly, the present disclosure is not limited to any specific method for entering secondary information. At step 610, a search key is generated based on the surface descriptor of the selected component and one or more secondary identifiers. At step 612, a search is performed of the blockchain to determine whether the blockchain platform includes an authentication record that matches the surface descriptor of the selected component. To perform the search, the search key may be submitted to a search engine that is the same or similar to the search engine 114. In some implementations, in response to receiving the search key, the search engine may execute the process 800, which is discussed with respect to FIG. 8. At step 614, an indication is received from the search engine that indicates whether the part is authentic. At step 616, a determination is made if any there are any components in the plurality that remain to be authenticated. If there are components that remain to be authenticated, the process 600 returns to step 602 and another one of the plurality of components is authenticated by executing steps 604-614. Otherwise, if there are no other components that remain to be processed, the process 600 ends.

Although in the present example the search key includes the surface descriptor, the lot identifier, and the part identifier of the selected component, alternative implementations are possible in which the search key includes only the surface descriptor. Furthermore, although in the present example the search key includes both the part identifier and lot identifier of the selected component, alternative implementations are possible in which the search key includes only one of the lot identifiers and the part identifier. Stated succinctly, the present disclosure is not limited to any specific type of search key.

Figure 7:
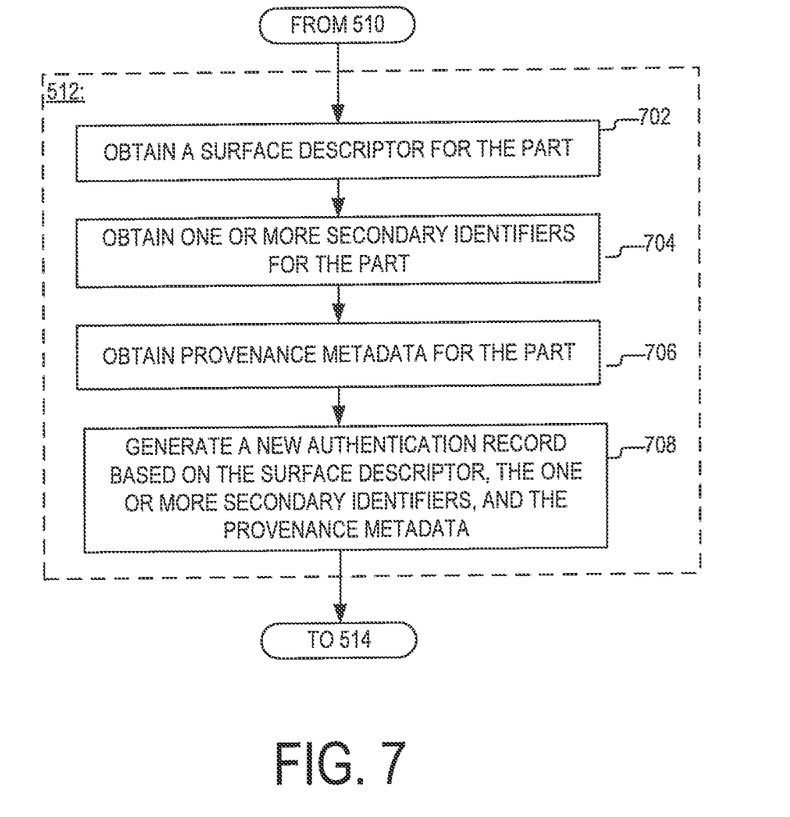
FIG. 7 is a flowchart of an example of a process associated with the process of FIG. 5, according to aspects of the disclosure.

FIG. 7 is a flowchart of an example of a process 700 for generating an authentication record for a new part, as specified at step 512 of the process 500. As noted above, the new authentication record may be generated by a part scanner, such as any of the part scanners 120.

At step 702, a surface descriptor is obtained for the new part. In some implementations, the surface descriptor may be obtained by capturing an image of a surface of the new part and generating a surface descriptor for the new part. In some implementations, the image of the surface of the new part may be obtained using a camera that is integrated into the part scanner.

At step 704, one or more secondary identifiers for the new part are obtained. As noted above, the one or more secondary identifiers may include a lot identifier associated with the part, a part identifier associated with the new part, a serial number associated with the part, and/or any other suitable type of secondary identifier. In some implementations, the one or more secondary identifiers may be obtained by scanning a bar code or text that is printed on the new part. Additionally or alternatively, in some implementations, the one or more secondary identifiers may be received (e.g., over a communications network or a Bluetooth connection) from one or more computing devices that are configured to monitor the operation of the assembly line where the new part is produced and generate secondary identifiers (e.g., lot identifiers, part identifiers, serial numbers, etc.) for new parts that are being produced on the assembly line.

At step 706, provenance metadata associated with the new part is obtained. The provenance metadata may include one or more surface descriptors. Each of the surface descriptors may belong to a different component that is used to make the new part. In some implementations, the surface descriptor of any of the plurality of components of the new part may be obtained by capturing an image of a surface of the component and processing the image to generate the surface descriptor. Additionally or alternatively, in some implementations, the surface descriptor of any of the plurality of components used to make the new part may be retrieved from the blockchain that is used to authenticate the component. Specifically, when the component is authenticated (e.g., at step 614 of the process 600), an authentication record for the component may be retrieved by the part scanner, after which the surface descriptor of the component may be extracted from the authentication record of the component for use as provenance metadata for the new part that is built using the component.

At step 708, a new authentication record is instantiated. After the authentication record is instantiated, the surface descriptor of the new part, the one or more secondary identifiers, and the provenance metadata are inserted in the newly-instantiated authentication record. Although in the present example the newly-instantiated authentication record includes provenance metadata, alternative implementations are possible in which any of the provenance metadata and secondary identifiers are omitted.

Figure 8:
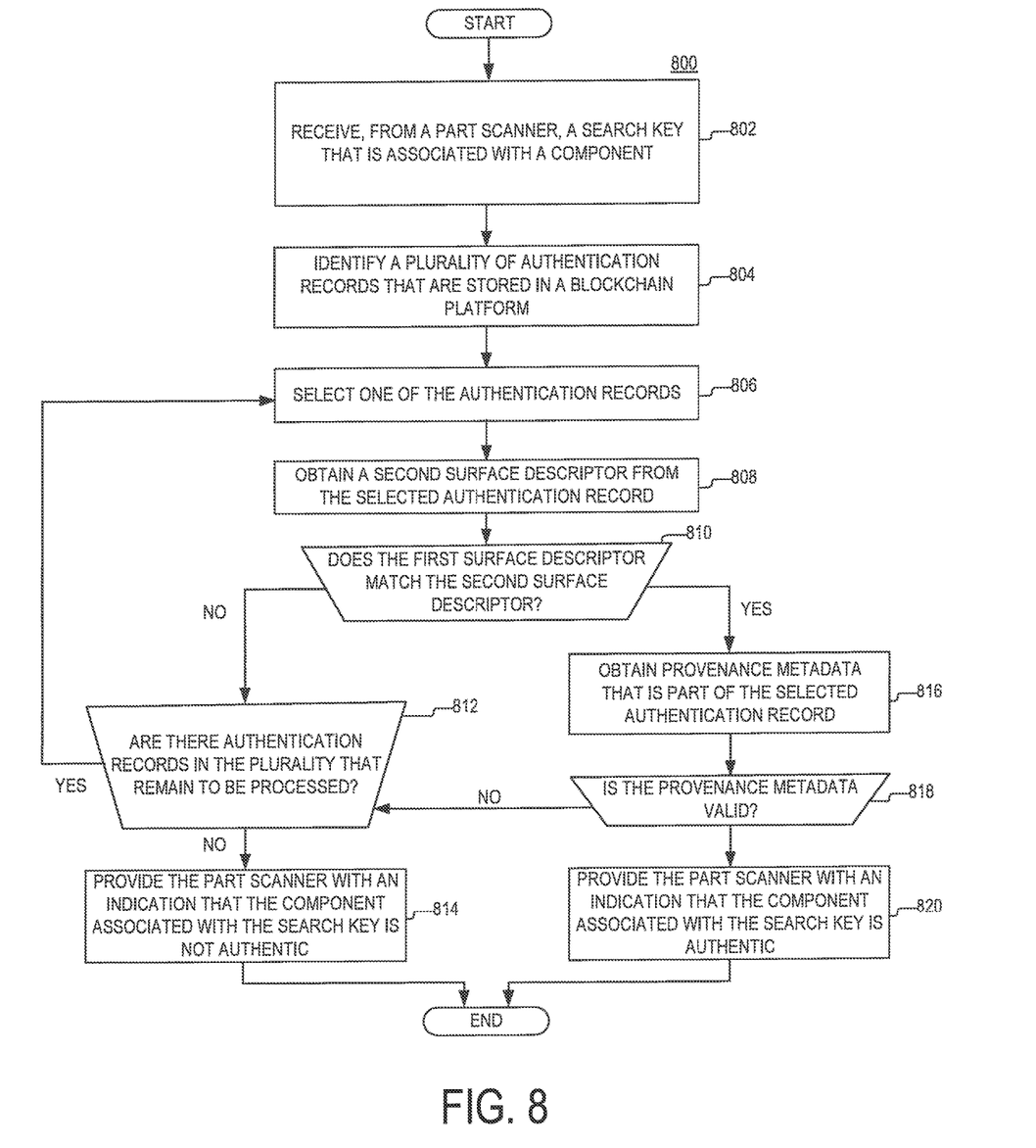
FIG. 8 is a flowchart of an example of a process, according to aspects of the disclosure.

FIG. 8 is a flowchart of an example of a process 800, according to aspects of the disclosure. The process 800 may be performed by a search engine that is integrated into a blockchain platform. The search engine may be the same or similar to the search engine 114, and the blockchain platform may be the same or similar to the blockchain platform 110.

At step 802, the search engine receives, from a record manager that is executed on the same part scanner as the search engine, a search key that is associated with a component whose authenticity is being validated by the part scanner. According to the present example, the search key includes a surface descriptor of the component, a lot identifier of the component, and a part identifier of the component. At step 804, the search engine identifies one or more authentication records that are stored in the blockchain which include lot identifiers and part identifiers that are the same as (or otherwise match) the lot/part identifiers provided in the search key. At step 806, the search engine selects one of the plurality of authentication records. At step 808, the search engine obtains a second surface descriptor that is contained in the selected authentication record. At step 810, the search engine determines whether the first surface descriptor matches the second surface descriptor. If the first surface descriptor does not match the second surface descriptor, the process 800 proceeds to step 812. Otherwise, if the first surface descriptor matches the second surface descriptor, the process 800 proceeds to step 816.

At step 812, a determination is made if all authentication records in the plurality identified at step 804 have been processed. If there are authentication records that remain to be processed, the process 800 returns to step 806 and steps 808-816 are executed again for another authentication record in the plurality. Otherwise, if there are no authentication records that remain to be processed, the process 800 proceeds to step 814. At step 814, the search engine provides the part scanner with an indication that the component associated with the search key is not authentic.

At step 816, the search engine obtains provenance metadata that is stored in the selected authentication record. As noted above, the provenance metadata may include respective surface descriptors of one or more parts that are used to produce the component associated with the search key. At step 818, the search engine determines if the provenance metadata is valid. According to the present example, the provenance metadata is valid when, for each surface descriptor that is included in the provenance metadata, an authentication record is stored in the blockchain platform that includes another surface descriptor that matches the former surface descriptor. In some implementations, the validation of each surface descriptor that is part of the provenance metadata may be performed by recursively executing the process 800 for the surface descriptor. If the provenance metadata is not valid, the process 800 proceeds to step 812. Otherwise, if the provenance metadata is valid, the process 800 proceeds to step 820. At step 820, the search engine provides the record manager with an indication that the component associated with the search key is authentic.

In some implementations, the search engine may determine whether the first surface descriptor and the second surface descriptor match by calculating a distance between the first surface descriptor and the second surface descriptor. If the distance is below a threshold, the search engine may determine that the first surface descriptor and the second surface descriptor match. Otherwise, if the distance is above a threshold, the search engine may determine that the first surface descriptor and the second surface descriptor do not match. According to the present example, the calculated distance is the squared sum of distances between respective features that are found in the first and second surface descriptors. However, it will be understood that alternative implementations are possible in which any other suitable technique for calculating distances between image feature vectors is used instead.

According to the present example, the indication that the component associated with the search key is not authentic (i.e., the indication transmitted at step 814) includes an empty list of search results. However, alternative implementations are possible in which the indication includes any suitable number or string that can be used by the part scanner to determine that the component associated with the search key is not authentic, such as the string "counterfeit," for example. According to the present example, the indication that the component associated with the search key is authentic (i.e., the indication transmitted at step 820) includes the authentication record containing a second surface descriptor that matches the first surface descriptor, which is provided in the search key. However, alternative implementations are possible in which the indication includes any suitable number or string that can be used by the part scanner to determine that the component associated with the search key is authentic, such as the string "authentic," for example. As discussed above, after receiving the authentication record, the part scanner may extract the second surface descriptor from it and use the extracted second surface descriptor as provenance metadata for the authentication record of a new part that is produced using the component associated with the search key.

According to the present example, the search engine uses the search part identifier and lot identifier that are provided in the search key to narrow down the number of authentication records that could potentially match the search key. In this regard, the inclusion of the lot identifier and the part identifier in the search key, as well as the authentication records that are stored on the blockchain platform, may help improve the efficiency of the search engine. Furthermore, according to the present example, the validation of provenance metadata may help ensure that component associated with the search key has been manufactured using authentic parts/components. In this regard, the inclusion of provenance metadata in the authentication records that are stored in the blockchain platform is advantageous because it may provide an additional layer of confidence in the authenticity (and/or reliability) of the component associated with the search key.

Although in the present example the search key received at step 802 includes both a lot identifier and a part identifier, it will be understood that alternative implementations are possible in which any other suitable type of secondary identifier is included in the search key. Furthermore, it will be understood that alternative implementations are possible in which the search key does not include any secondary identifiers. In the latter case, the search engine may perform a linear search of all authentication records that are stored in the blockchain platform. Moreover, it will be understood that alternative implementations are possible, in which provenance metadata is not used to confirm the authenticity of the component associated with the search key. In such implementations, steps 816 and 818 may be omitted from the process 800.

As noted above, in some implementations, the part scanner discussed with respect to FIG. 8 may be configured to operate as a node in the blockchain platform that is discussed with respect to FIG. 8. In such instances, the part scanner may include a full or partial copy of the ledger of the blockchain platform, and it may be configured to execute a first process and a second process. The first process may be configured to generate the search key received at step 802 and receive an indication of whether the component associated with the search key is authentic. The second process, on the other hand, may be configured to implement the search engine and/or other functions which are normally associated with blockchain nodes. The second process may be configured to provide the notification(s) of whether the component associated with the search key is authentic via shared memory and/or any other suitable method for inter-process communication. Alternatively, in some implementations, the blockchain platform may be implemented separately from the part scanner. In such implementations, the search engine and the part scanner may interact with one another by transmitting messages over a communications network. Stated succinctly, the present disclosure is not limited to any specific method of communication between the search engine and part scanner.

Figure 9:
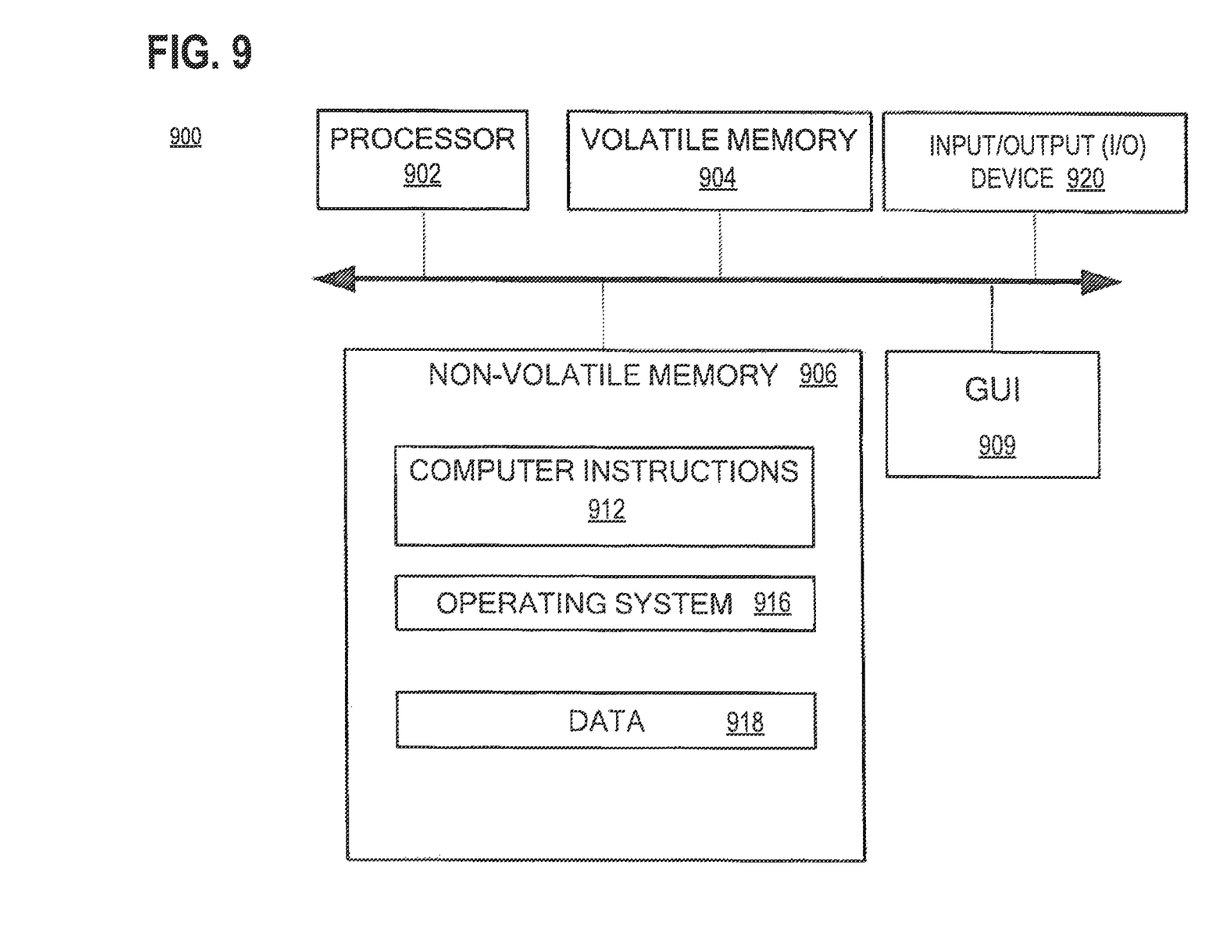
FIG. 9 is a diagram of an example of a computing device, according to aspects of the disclosure.

FIG. 9 is a diagram of an example of a computing device 900, according to aspects of the disclosure. Computing device 900 may include processor 902, volatile memory 904 (e.g., RAM), non-volatile memory 906 (e.g., a hard disk drive, a solid state drive such as a flash drive, a hybrid magnetic and solid state drive, etc.), graphical user interface (GUI) 909 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 909 or received from I/O device 920.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for supply chain management, the method comprising:
   capturing, by a part scanner, a first image of a surface of a part;
   generating, by the part scanner, a first surface descriptor for the part based on the first image;
   identifying, by the part scanner, a second surface descriptor that corresponds to a component of the part;
   generating, by the part scanner, an authentication record for the part based on the first surface descriptor and the second surface descriptor, wherein the first surface descriptor and the second surface descriptor are recorded separately of one another in the authentication record, and the second surface descriptor is recorded in the authentication record as provenance metadata for the part; and
   storing, by the part scanner, the authentication record in a cryptographically-auditable ledger of a blockchain platform.

2. The method of claim 1, wherein the part scanner is configured to operate as a node of the blockchain platform and form consensus with other nodes in the blockchain platform.

3. The method of claim 1, wherein the first surface descriptor is generated using a feature description algorithm, the feature description algorithm including at least one of Speeded-Up Robust Features (SURF) Histogram of Oriented Gradients (HOG), Gradient Location and Orientation Histogram (GLOH), Local Energy-Based Shaped Histogram (LESH), and Scale-Invariant Feature Transform (SIFT).

4. The method of claim 1, wherein identifying the second surface descriptor includes retrieving the second surface descriptor from the blockchain platform.

5. The method of claim 1, wherein identifying the second surface descriptor includes capturing a second image of a surface of the component of the part and generating the second surface descriptor based on the second image.

6. The method of claim 1, further comprising detecting whether the component is authentic by:
   performing a search of the blockchain platform to detect whether at least one authentication record is stored in the blockchain platform that matches the second surface descriptor;
   when at least one authentication record is stored in the blockchain platform that matches the second surface descriptor, detecting that the component is authentic; and
   when no authentication records are stored in the blockchain platform that match the second surface descriptor, detect that the component is counterfeit.

7. The method of claim 6, wherein the search of the blockchain platform is performed based on a search key that includes the second surface descriptor and a lot identifier associated with the component, and the component is used to produce the part only when it is detected that the component is authentic.

8. A system comprising:
   a camera;
   a memory; and
   at least one processor operatively coupled to the camera and the memory, the at least one processor being configured to perform the operations of:
   capturing, by the camera, a first image of a surface of a part;
   generating a first surface descriptor for the part based on the first image;
   identifying a second surface descriptor that corresponds to a component of the part;
   generating an authentication record for the part based on the first surface descriptor and the second surface descriptor, wherein the first surface descriptor and the second surface descriptor are recorded separately of one another in the authentication record, and the second surface descriptor is recorded in the authentication record as provenance metadata for the part; and
   storing the authentication record in a cryptographically-auditable ledger of a blockchain platform.

9. The system of claim 8, wherein the system is configured to operate as a node of the blockchain platform and form consensus with other nodes in the blockchain platform.

10. The system of claim 8, wherein the first surface descriptor is generated by using a feature description algorithm, the feature description algorithm including at least one of Speeded-Up Robust Features (SURF) Histogram of Oriented Gradients (HOG), Gradient Location and Orientation Histogram (GLOH), Local Energy-Based Shaped Histogram (LESH), and Scale-Invariant Feature Transform (SIFT).

11. The system of claim 8, wherein identifying the second surface descriptor includes retrieving the second surface descriptor from the blockchain platform.

12. The system of claim 8, wherein identifying the second surface descriptor includes capturing a second image of a surface of the component of the part and generating the second surface descriptor based on the second image.

13. The system of claim 8, wherein the at least one processor is further configured to perform the operation of detecting whether the component is authentic by:
  performing a search of the blockchain platform to detect whether at least one authentication record is stored in the blockchain platform that matches the second surface descriptor;
  when at least one authentication record is stored in the blockchain platform that matches the second surface descriptor, detecting that the component is authentic; and
  when no authentication records are stored in the blockchain platform that match the second surface descriptor, detect that the component is counterfeit.

14. The system of claim 13, wherein the search of the blockchain platform is performed based on a search key that includes the second surface descriptor and a lot identifier associated with the component, and the component is used to produce the part only when it is detected that the component is authentic.

15. A non-transitory computer-readable medium storing one or more processor-executable instructions, which when executed by at least one processor, cause the at least one processor to perform the operations of:
  capturing a first image of a surface of a part;
  generating a first surface descriptor for the part based on the first image;
  identifying a second surface descriptor that corresponds to a component of the part;
  generating an authentication record for the part based on the first surface descriptor and the second surface descriptor, wherein the first surface descriptor and the second surface descriptor are recorded separately of one another in the authentication record, and the second surface descriptor is recorded in the authentication record as provenance metadata for the part; and
  storing the authentication record in a cryptographically-auditable ledger of a blockchain platform.

16. The non-transitory computer-readable medium of claim 15, wherein the first surface descriptor is generated by using a feature description algorithm, the feature description algorithm including at least one of Speeded-Up Robust Features (SURF) Histogram of Oriented Gradients (HOG), Gradient Location and Orientation Histogram (GLOH), Local Energy-Based Shaped Histogram (LESH), and Scale-Invariant Feature Transform (SIFT).

17. The non-transitory computer-readable medium of claim 15, wherein identifying the second surface descriptor includes retrieving the second surface descriptor from the blockchain platform.

18. The non-transitory computer-readable medium of claim 15, wherein identifying the second surface descriptor includes capturing a second image of a surface of the component of the part and generating the second surface descriptor based on the second image.

19. The non-transitory computer-readable medium of claim 15, wherein the one or more processor-executable instructions further cause the at least one processor to perform the operation of detecting whether the component is authentic by:
  performing a search of the blockchain platform to detect whether at least one authentication record is stored in the blockchain platform that matches the second surface descriptor;
  when at least one authentication record is stored in the blockchain platform that matches the second surface descriptor, detecting that the component is authentic; and
  when no authentication records are stored in the blockchain platform that match the second surface descriptor, detect that the component is counterfeit.

20. The non-transitory computer-readable medium of claim 19, wherein the search of the blockchain platform is performed based on a search key that includes the second surface descriptor and a lot identifier associated with the component, and the component is used to produce the part only when it is detected that the component is authentic.

* * * * *